United States Patent
Fox et al.

(10) Patent No.: US 11,329,838 B2
(45) Date of Patent: May 10, 2022

(54) MANAGING BYSTANDER EFFECTS IN ELECTRONIC COMMUNICATIONS

(71) Applicant: INTERNATIONAL BUSINESS MACHINES CORPORATION, Armonk, NY (US)

(72) Inventors: Jeremy R. Fox, Georgetown, TX (US); Jonathan D. Dunne, Dungarvan (IE); Liam S. Harpur, Skerries (IE); Kelley Anders, East New Market, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 16/813,485

(22) Filed: Mar. 9, 2020

(65) Prior Publication Data
US 2021/0281435 A1    Sep. 9, 2021

(51) Int. Cl.
*H04L 12/18* (2006.01)
*G06N 20/00* (2019.01)
(Continued)

(52) U.S. Cl.
CPC ......... *H04L 12/1827* (2013.01); *G06N 20/00* (2019.01); *H04L 12/1822* (2013.01);
(Continued)

(58) Field of Classification Search
None
See application file for complete search history.

(56) References Cited

U.S. PATENT DOCUMENTS 10,257,340 B2    4/2019   Adderly et al.
2019/0238682 A1* 8/2019   Christiano ............ H04M 3/563
(Continued)

OTHER PUBLICATIONS

Burkley, M., "Why Do We Help Less When There is a Crowd? Less is More When it Comes to Bystanders," [online] Psychology Today © 2020 Sussex Publishers, LLC, Nov. 4, 2009, retrieved from the Internet: <https://www.psychologytoday.com/us/blog/the-social-thinker/200911/why-do-we-help-less-when-there-is-crowd>, 6 pg.
(Continued)

*Primary Examiner* — June Sison
(74) *Attorney, Agent, or Firm* — Cuenot, Forsythe & Kim, LLC

(57) ABSTRACT

Bystander effect management can include determining a likelihood of a bystander effect on at least one chat participant engaging in a chat discourse over an electronic communications network. The likelihood can be determined by a bystander effect perception (BEP) model generated based on collaboration interaction metrics derived from prior discourses conducted over the electronic communications network by a chat group. A bystander effect reaction (BER) can be generated in response to determining that the likelihood of the bystander effect exceeds a predetermined threshold, the BER being determined based on the BEP model to be more likely than not to enhance collaboration among at least some chat participants engaging in the chat discourse. A notification based on the BER can be conveyed to one or more chat participants engaging in the chat discourse over the electronic communications network.

14 Claims, 6 Drawing Sheets

(51) Int. Cl.
*H04L 51/222* (2022.01)
*H04W 4/029* (2018.01)
*H04L 51/00* (2022.01)

(52) U.S. Cl.
CPC .............. *H04L 51/16* (2013.01); *H04L 51/20* (2013.01); *H04W 4/029* (2018.02)

(56) References Cited

U.S. PATENT DOCUMENTS

| | | | |
|---|---|---|---|
| 2019/0297035 A1* | 9/2019 | Fox | G06F 16/24575 |
| 2020/0050998 A1* | 2/2020 | Bastide | G06Q 10/06314 |
| 2020/0372475 A1* | 11/2020 | Bastide | G06Q 10/06312 |
| 2021/0058264 A1* | 2/2021 | Fahrendorff | G10L 15/22 |

OTHER PUBLICATIONS

Markey, PM, "Bystander intervention in computer-mediated communication," In Computers in Human Behavior, Mar. 31, 2000, vol. 16, No. 2, pp. 183-188.

Hudson, JM et al., "The bystander effect: A lens for understanding patterns of participation," In The Journal of the Learning Sciences, Apr. 1, 2004, vol. 13, No. 2, pp. 165-195.

Yan, B et al., "Beyond reciprocity: The bystander effect of knowledge response in online knowledge communities," In Computers in Human Behavior, Nov. 1, 2017, vol. 76, pp. 9-18.

Voelpel, SC et al., "David against Goliath? Group size and bystander effects in virtual knowledge sharing," In Human Relations, Feb. 2008, vol. 61, No. 2, pp. 271-295.

Cieciura, JA, "Summary of the Bystander Effect: Historical Development and Relevance in the Digital Age," In Inquiries Journal, 2016, vol. 8, No. 11.

Reswara, IP et al., "The Role of Personal Chat in Line Application in the Helping Behavior of Students at the Faculty of Psychology Universitas Padjadjaran," In UI Proceedings on Social Science and Humanities, Apr. 2017, vol. 27, No. 1, 5 pg.

Van Bommel, M. "The Reputable Bystander: The Role of Reputation in Activating or Deactivating Bystanders," 2015, Social and Organizational Psychology, VU University Amsterdam, Netherlands Institute for the Study of Crime and Law Enforcement—NSCR, Phoolan Devi Institute, VU University Amsterdam, 154 pg.

Dimiccoli, M. et al., "Mitigating Bystander Privacy Concerns in Egocentric Activity Recognition with Deep Learning and Intentional Image Degradation," In Proc. of ACM on Interactive, Mobile, Wearable and Ubiquitous Technologies, vol. 1, No. 4, Art. 132, Dec. 2017, 18 pg.

* cited by examiner

300

---

Determine a likelihood of a bystander effect on at least one chat participant engaging in a chat discourse over an electronic communications network, the likelihood determined by a bystander effect perception (BEP) model generated based on collaboration interaction metrics derived from prior discourses conducted over the electronic communications network by a chat group
302

↓

Generate a bystander effect reaction (BER) in response to determining that the likelihood exceeds a predetermined threshold, wherein the BER is determined based on the BEP model to be more likely than not to enhance collaboration among at least some chat participants engaging in the chat discourse
304

↓

Convey a notification based on the BER to at least one chat participant engaging in the chat discourse over the electronic communications network
306

FIG. 3

MANAGING BYSTANDER EFFECTS IN ELECTRONIC COMMUNICATIONS

BACKGROUND

This disclosure relates to electronic communications, and more particularly, to enhancing collaboration between users communicating over an electronic communications network.

Electronic communications via a local area network, the Internet, or various other electronic communications networks enable individuals to collaborate even though remotely situated from one another. Collaboration is enhanced through use of collaboration and other messaging platforms. Collaboration platforms typically provide various software tools that allow individuals who are jointly working on a project or task to not only communicate directly with one another but also to share, process, and manage files, documents, and data so as to more efficiently accomplish a task or complete a project.

SUMMARY

In one or more embodiments, a method can include determining, with computer hardware, a likelihood of a bystander effect on at least one chat participant engaging in a chat discourse over an electronic communications network, the likelihood determined by a bystander effect perception (BEP) model generated based on collaboration interaction metrics derived from prior discourses conducted over the electronic communications network by a chat group. The method also can include generating a bystander effect reaction (BER) in response to determining that the likelihood exceeds a predetermined threshold, wherein the BER is determined based on the BEP model to be more likely than not to enhance collaboration among at least some chat participants engaging in the chat discourse. Additionally, the method can include conveying a notification based on the BER to at least one chat participant engaging in the chat discourse over the electronic communications network.

In one or more embodiments, a system includes a processor configured to initiate operations. The operations can include determining a likelihood of a bystander effect on at least one chat participant engaging in a chat discourse over an electronic communications network, the likelihood determined by a bystander effect perception (BEP) model generated based on collaboration interaction metrics derived from prior discourses conducted over the electronic communications network by a chat group. The operations also can include generating a bystander effect reaction (BER) in response to determining that the likelihood exceeds a predetermined threshold, wherein the BER is determined based on the BEP model to be more likely than not to enhance collaboration among at least one chat participant engaging in the chat discourse. Additionally, the operations can include conveying a notification based on the BER to at least some chat participants engaging in the chat discourse over the electronic communications network.

In one or more embodiments, a computer program product includes at least one non-transitory computer-readable storage medium having instructions stored thereon. The instructions are executable by a processor to initiate operations. The operations can include determining a likelihood of a bystander effect on at least one chat participant engaging in a chat discourse over an electronic communications network, the likelihood determined by a bystander effect perception (BEP) model generated based on collaboration interaction metrics derived from prior discourses conducted over the electronic communications network by a chat group. The operations also can include generating a bystander effect reaction (BER) in response to determining that the likelihood exceeds a predetermined threshold, wherein the BER is determined based on the BEP model to be more likely than not to enhance collaboration among at least some chat participants engaging in the chat discourse. Additionally, the operations can include conveying a notification based on the BER to at least one chat participant engaging in the chat discourse over the electronic communications network.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 3 is a flowchart of a method for bystander effect mitigation according to an embodiment.

DETAILED DESCRIPTION

Figure 1:
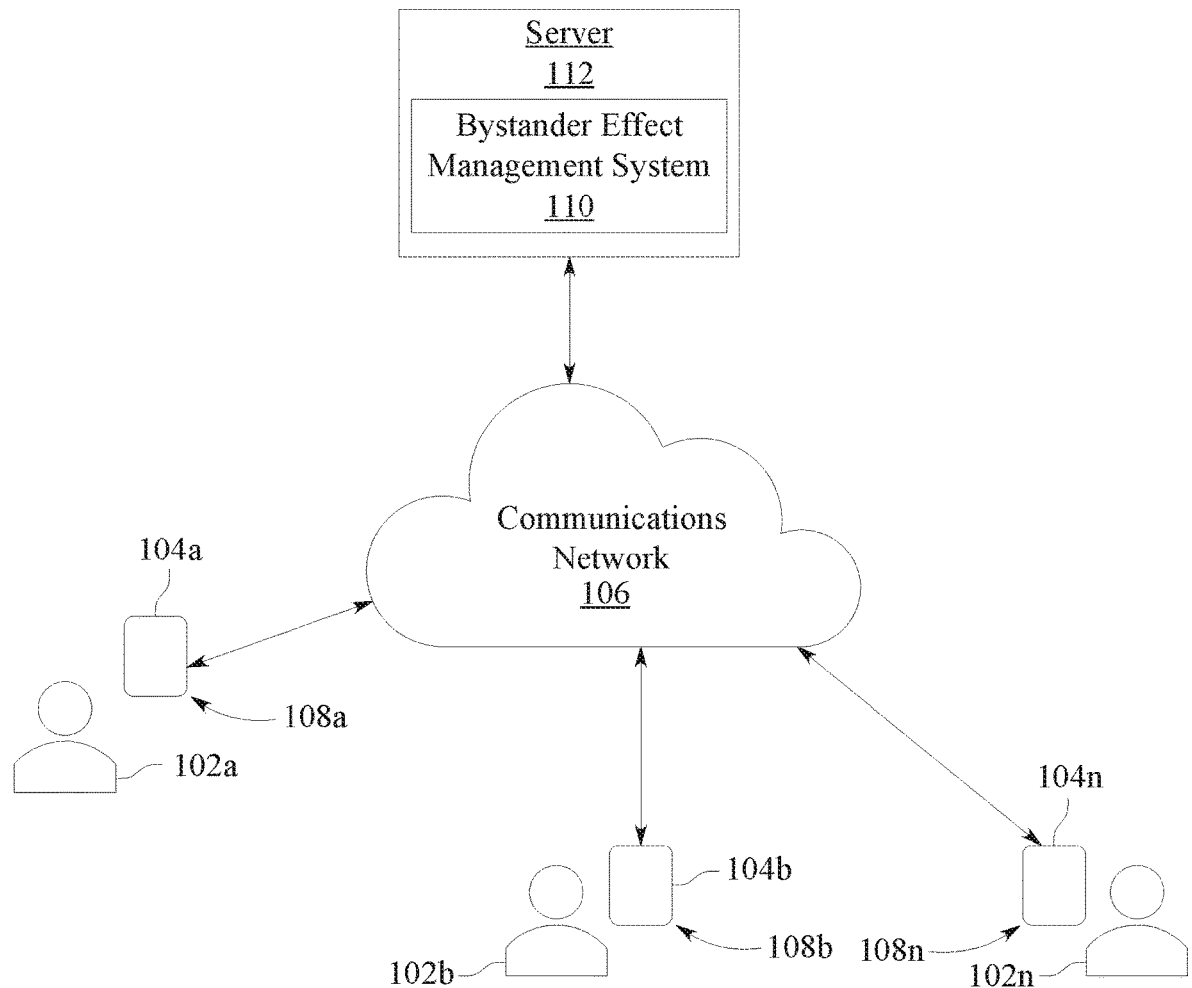
FIG. 1 depicts an example communications environment in which a bystander effect management system is operable according to an embodiment.

While this disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The disclosure relates to electronic communications, and more particularly, to enhancing collaboration between users communicating over an electronic communications network. Collaboration can be enhanced through use any of various on-line collaboration, social networking, or other messaging platforms that enable users to engage in conversations and exchange information rapidly and efficiently. As defined herein, "messaging platform" is any system that facilitates the exchange of electronic messages sent and received over the Internet or other data communications network. Relatedly, as also defined herein, "collaboration platform" is a messaging platform that incorporates tools and services that support individuals interacting over a data communications network in pursuit of a common goal or to accomplish a task. Examples of a messaging platform include, but are not limited to, team collaboration platforms, social networking platforms, and email systems, as well as other systems that facilitate communications via an electronic communications network. Mechanisms such as channels, inboxes, activity streams, timelines, and profiles, as well as social media walls that serve as digital hubs for gathering posts from social media at single site, enable users to connect and converse with one another and to share information in a logical and organized manner using a messaging platform.

Notwithstanding the efficiency and convenience provided by such platforms, collaboration using the platforms can nevertheless be less than optimal owing to bystander effects. The bystander effect is an empirically verified phenomenon according to which there is a correlation between the number of individuals proximately located to an event and the likelihood that any one of the individuals will become an active participant in the event. In the context of electronic communications, the bystander effect can affect an individual interacting on a team collaboration, social networking, or other messaging platform. The individual, if influenced by the bystander effect, is less likely to collaborate during chat discourse if the individual is aware that many other individuals are also engaged in the chat discourse on the platform. Different individuals have different levels of perception and correspondingly different thresholds for being affected by the bystander effect.

In accordance with the inventive arrangements disclosed herein, the differential effect that the bystander effect has on different individuals is machine determined. Automatic, machine-based responses are induced based on the determination. The induced actions can mitigate the bystander effect. Moreover, in situations in which collaboration is enhanced by reducing interactions among individuals interacting on a platform, the bystander effect is advantageously used to enhance collaboration by encouraging reduced interactions.

The methods, systems, and computer program products disclosed herein can determine, with computer hardware, the likelihood of a bystander effect on one or more one chat participants engaging in a chat discourse over an electronic communications network. The likelihood can be determined by a bystander effect perception model generated based on collaboration interaction metrics derived from prior discourses conducted over one or more electronic communications networks by one or more chat groups. In various embodiments, the bystander effect perception model is generated through machine learning. A bystander effect reaction is automatically generated in response to determining that the likelihood of a bystander effect exceeds a predetermined threshold. The bystander effect reaction, too, can be generated based on the bystander effect perception model. Based on the model, the bystander effect reaction is more likely than not a response that enhances collaboration among at least some chat participants engaging in the chat discourse.

"Chat discourse," as defined herein is a sequence of texts (or messages) conveyed over an electronic communications network beginning with an exchange between at least two individuals ("chat participants") and ending with the last exchange between at least two chat participants, regardless of the number of chat participants that may enter or leave the chat discourse during the intervening time and regardless of the time spanned by the chat discourse.

As defined herein, "engaged" and "engaging" means a chat participant is participating in an on-going chat discourse by submitting one or more texts (messages) to others during the chat discourse and/or actively considering one or more texts submitted by others during the chat discourse. A determination of whether an individual is actively engaged in a chat discourse can be based different metrics. For example, an individual can be determined to be engaged based on the number of messages (if any) contributed to a discourse within a predetermined time span or the time between messages contributed. Other metrics can also be used to make the determination.

With respect to a chat group, the chat participants can be classified as "active" or "inactive." The classification can be based, for example, on a predetermined time-based standard. The standard can be empirically determined or, optionally, established by one member or by agreement among all or a majority of members. For example, an active chat participant can be defined as a chat participant who views a message every n seconds and posts a message every m seconds, and an inactive chat participant as one who does not view and post messages within the predetermined time.

In the context of a chat discourse, "bystander effect" is defined as a deviation from a quantified norm of behavior of one or more chat participants based on the number of chat participants engaged in the chat discourse. A behavioral norm can be defined along one or more different dimensions in terms of chat participants' collaboration.

Relatedly, as defined herein, "collaboration" is conveying a message by one chat participant to one or more other chat participants over an electronic communications network during a chat discourse. Collaboration can be refined by specifying that the message states a fact, expresses an opinion, or poses a question, as distinct from a general expression (e.g., a greeting, a salutation). As described herein, the distinction can be made using natural language processing. Accordingly, one dimension for establishing a behavioral norm, for example, is the probability that each chat participant or a certain number of chat participants will collaborate at least once during the chat discourse. Another dimension, for example, is the time interval between such collaborations during the chat discourse. Probabilistically, the time can be an expected time, with time as a random variable. Yet another dimension, for example, is the length of collaboration, measured as the number of words per message. Length of collaboration can be an average length, with length as a random variable.

As described herein, bystander effect management is performed by computer hardware that implements certain forms of artificial intelligence. The artificial intelligence in certain embodiments is implemented with machine learning. Machine learning essentially enables machines (computers) to "learn" to discover statistical relationships. In the field of artificial intelligence, such statistical relationships have proven more robust than rule-based processing of data under various condition and in certain circumstances.

The arrangements described herein are directed to computer technology and provide an improvement to computer technology. Specifically, the present arrangements, improve the operative efficiency of on-line collaboration, social networking, and other such messaging platforms. For example, reducing and/or eliminating the bystander effect can increase the speed with which chat discourses are conducted and concluded, thereby reducing unnecessary use and wastage of computing resources. Conversely, under certain circumstances, the arrangements described herein can leverage the bystander effect to likewise increase the speed with which chat discourses are conducted and concluded to also reduce unnecessary use and wastage of computing resources.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Referring initially to FIG. 1, example communications environment 100 is depicted. Communications environment 100 is an example of the different types of communications environment (e.g., cloud-based) in which bystander effect management system is operable, according to different embodiments. Illustratively, communications environment 100 includes multiple users 102a, 102b, and 102n who communicate with one another using communication devices 104a, 104b, and 104n, respectively. Although only three such users and user devices are shown, it will be readily recognized that communications environment 100 can, and typically does, include many more users and user devices.

Communication devices 104a-104n can comprise various types of electronic devices, including, for example, a smartphone or other mobile device, a computer (e.g., desktop, laptop, tablet computer), virtual assistant, smart TV, or other communication/computing device capable of facilitating electronic communications. It will be appreciated that in various embodiments one or more of communication devices 104a-104n can be deployed as a standalone device or deployed as multiple devices in a distributed client-server networked system. For example, in certain embodiments, a smartwatch can operatively couple to a mobile device (e.g., cell phone).

Illustratively, communication devices 104a-104n communicatively couple with one another via electronic communications network 106. Electronic communications network 106 provides communication links between various devices and data processing systems. Electronic communications network 106 can link users 102a-102n using communication devices 104a-104n, for example, to an instant messaging service, a team collaboration service, a social networking service, or similar service or messaging platform. The communication links can include connections, such as wired communication links, wireless communication links, or fiber optic cables, and can be implemented as, or include, one or more (or any combination of) different communication technologies such as a wide area network (WAN), a local area network (LAN), a wireless network (e.g., a wireless WAN and/or a wireless LAN), a mobile or cellular network, a virtual private network (VPN), the Internet, a public switched telephone network (PSTN), and so forth.

As defined herein, "communication link" means a mode of communication using one or more electronic devices. A communication link is associated with a specific format and/or communication protocol for sending messages. For example, using a specific format and/or communication protocol, an electronic device can send a message to another electronic device as a text message, an email, a video call, a voice call, and/or a post to a social networking system or team collaboration platform. A communication link for exchanging text messages is considered a distinct communication link. Likewise, a communication link for exchanging emails is a distinct communication link, as is a communication link for video calls and a communication link for voice calls. So, too, a communication link used for posting to a social networking system or team collaboration platform is considered a distinct communication link. Accordingly, each type of communication link corresponding to a different type or mode of communication is considered a distinct communication link.

Each of communication devices 104a-104n is endowed with processing capabilities and/or circuitry 108a, 108b, and 108n that communicatively couples the devices to an instant messaging service, a team collaboration service, a social networking service, and/or similar service or messaging platform via electronic communications network 106. Accordingly, users 102a-102n can comprise a chat group that engage in chat discourses through exchanges of messages (e.g., text, emails) using an online discussion forum, social network community, or other collaboration platform.

Bystander effect management system 110, according to an embodiment, can be operatively coupled to or integrated in an instant messaging service, a team collaboration service, a social networking service, or similar service or messaging platform to which communication devices 104a-104n are communicatively linked via electronic communications network 106. Indeed, bystander effect management system 110 can be operatively combined with any networking or messaging platform, such as ones using an application layer protocol (e.g., Internet Relay Chat, XMPP, or similar proprietary protocol) for communications—both group communications in discussion forums ("channels) and one-to-one communications via private messaging platforms—as well as data transfers and file sharing. Bystander effect management system 110 optionally can include a speech-to-text processor for converting voice into text to enable the system to perform the functions described herein with respect to voice-based communications as well as text-based communications.

Bystander effect management system 110, in certain embodiments, is implemented as a set of computer system-executable instructions illustratively executing on server 112, which communicatively couples to communication devices 104a-104n via electronic communications network 106. Accordingly, bystander effect management system 110 can be implemented in various types of computer systems (e.g., cloud-based server) such as computer system 612 described with reference to FIG. 6. In various embodiments, bystander effect management system 110 can be implemented in computer system-executable instructions, in dedicated circuitry, or in a combination of circuitry and computer system-executable instructions.

Figure 2:
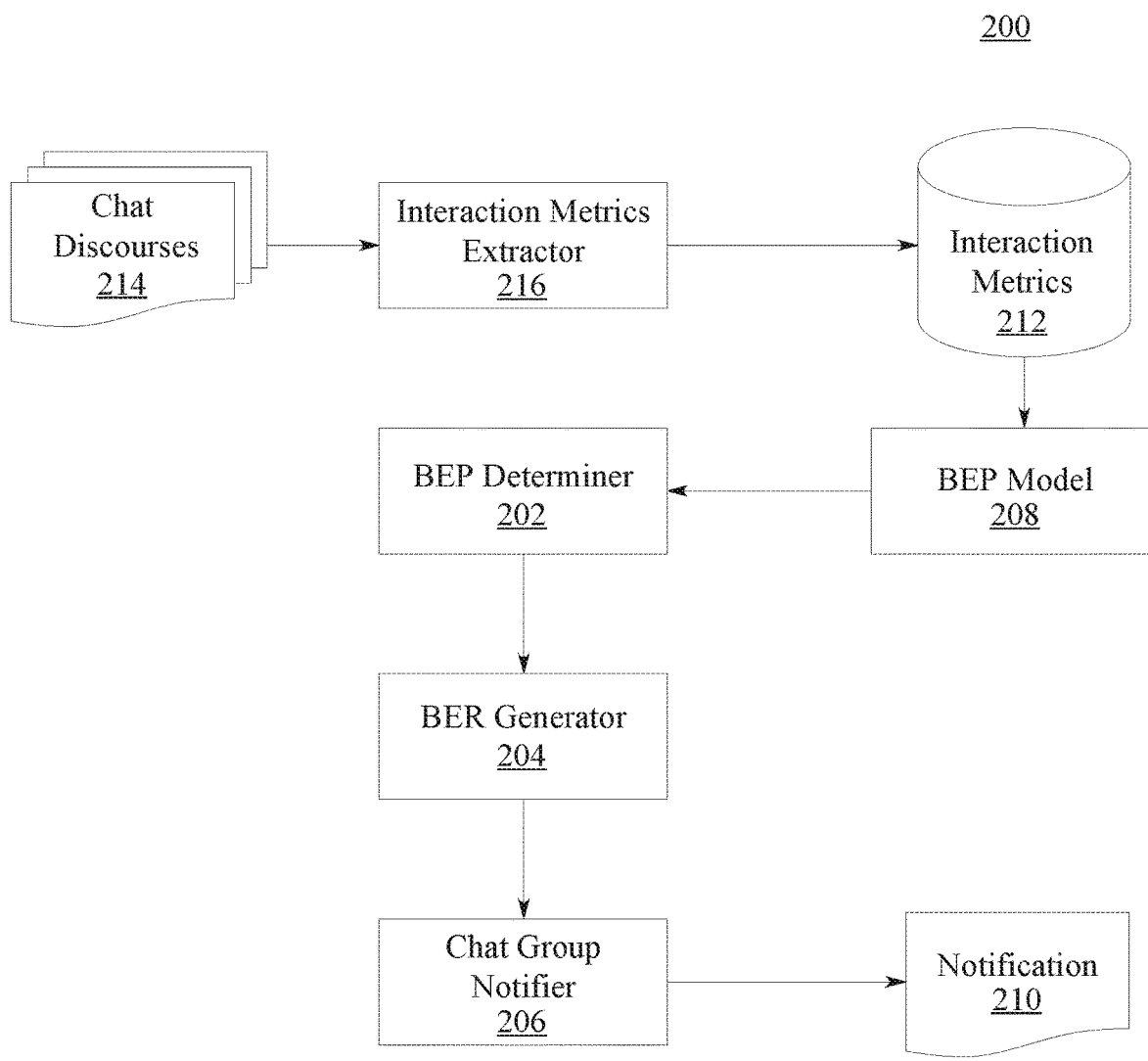
FIG. 2 depicts certain components of an example bystander effect management system according to an embodiment.

Referring now to FIG. 2, example bystander effect management system 200 is depicted in accordance with an embodiment. Bystander effect management system 200 illustratively includes bystander effect perception (BEP) determiner 202, bystander effect reaction (BER) generator 204, and chat group notifier 206. BEP determiner 202, BER generator 204, and chat group notifier 206 can be implemented in a set of computer system-executable instructions, in dedicated circuitry, or in a combination of circuitry and computer system-executable instructions.

Bystander effect management system 200 is operatively engaged over an electronic communications network (FIG. 1) during a chat discourse engaged in by multiple chat participants and conducted over the electronic communications network using a collaboration or other messaging platform. Operatively, BEP determiner 202 determines the likelihood of a bystander effect on one or more chat participants who are engaged in the chat discourse. The likelihood is determined by BEP determiner 202 based on BEP model 208. If the likelihood exceeds a predetermined threshold, BER generator 204 generates a bystander effect reaction (BER). The BER, based on BEP model 208, is determined to be more likely than not to enhance collaboration (determined as described below) among one or more chat participants engaging in the chat discourse. As defined herein, "more likely than not" means a greater than fifty percent probability. Chat group notifier 206 conveys notification 210 to one or more chat participants over the electronic network, the notification based on the BER generated by BER generator 204. Notification 210 can describe the ameliorative or collaboration enhancing action that is generated by BER generator 204 in response to the likelihood of a bystander effect on one or more chat participants and can recommend that the action be undertaken by one or more chat participants. Optionally, as described below, the action can be automatically invoked irrespective of any action by one or more chat participants.

Different individuals—generally, and as chat participants in a chat discourse, specifically—exhibit different levels of perception and different thresholds for being influenced by the bystander effect and acting or refraining from acting in response. For example, a chat participant engaged in a chat discourse may be more likely to refrain from collaboration through electronic messaging the greater the number of other chat participants whom the chat participant is aware of. Similarly, the interval between the chat participant's collaborations (e.g., messaging) may be longer the greater the number of other chat participants of whom the chat participant is aware. However, under certain circumstances, the bystander effect can be a positive effect if it induces the chat participant to collaborate, for example, through less verbose, less argumentative, or less irrelevant messaging.

The BER, in accordance with certain embodiments, can be a reduction in the number of chat participants engaged in the discourse or, conversely, an increase in the number of participants. A reduction in the number of participants is calculated to likely enhance collaboration by reducing the bystander effect on those members of the chat group that remain engaged in the discourse. An increase in the number of participants engaging in the discourse is calculated to likely enhance discourse efficiency by leveraging the bystander effect. Leveraging the bystander effect to enhance efficiency can operate by reducing the likelihood that some or all participants directly engage in messaging the other participants and/or by increasing the likelihood that some or all participants reduce the extent of their messaging—that is, by being less verbose and more concise in their messaging.

In certain embodiments, the BER can enhance collaboration by making an individual aware of the likelihood that the individual, as chat participant, is affected by the bystander effect. Notification 210 can be conveyed to the individual by chat group notifier 206 over the electronic communications network and can recommend to the individual one or more ameliorative actions that the individual can take to mitigate or eliminate the bystander effect based on the BER generated by BER generator 204. For example, the BER can recommend that the individual increase participation in the chat discourse through messaging, respond to messaging more rapidly, and/or provide lengthier messages to counter the bystander effect determined by BEP determiner 202 to be a likely effect on the individual as a chat participant.

The likelihood of the bystander effect is determined by BEP determiner 202, which predicts when and/or under what conditions that a chat participant is likely to experience and act in response to the bystander effect. BEP model 208 used by BEP determiner 202 to predict the likelihood of the bystander effect can be generated based on various statistical and/or machine learning techniques applied with respect to collaboration interaction metrics 212. Collaboration interaction metrics 212 are extracted from prior chat discourses 214 by interaction metrics extractor 216.

BEP model 208, in certain embodiments, is a general model that is based on a random sample of prior chat discourses among one or more chat groups and that accurately represents a larger population of chat groups. BEP model 208 thus reflects a probability or likelihood of the bystander effect on an individual based on data from chat participants across different chat groups. In other embodiments, BEP model 208 is derived using collaboration interaction metrics extracted from prior chat discourses of a specific chat group whose members, in various combinations, routinely engage in discourses over one or more collaboration or messaging platforms. BEP model 208 accordingly reflects a probability or likelihood of a member of the chat group based on data corresponding members of a specific chat group. In still other embodiments, BEP model 208 can be based on prior chat discourses of a specific individual who engages in discourses over one or more collaboration or messaging platforms.

Relatedly, bystander effect management system 200 can be implemented in a specific collaboration or other messaging platform. Bystander effect management system 200 alternatively can be implemented, for example, in a cloud-based environment and associated with user-specific accounts that enable operation of the system across multiple platforms. Each user, in the alternative case, can register each platform such that bystander effect management system 200 is operable on each such platform.

BEP model 208 can be derived using one or more different types of collaborative interaction metrics 212 in various combinations. Based on different collaborative interaction metrics 212 in different combinations, BEP model 208 can comprise different probability models. In some embodiments, BEP model 208 can comprise a probability model that predicts, based on the number of chat participants, the likelihood that a chat participant will collaborate by making at least one contribution to the chat discourse, the contribution being a message that provides a fact, gives an opinion, offers an insight, or poses a relevant question. BEP model 208 can be derived based on an analysis of prior chat discourses to determine, for example, a sample average and variance of the number of such messages per chat participant, per chat discourse given the number of chat participants. In an embodiment, a regression analysis can be performed that can provide, for example, a probability of at least one contribution per chat participant given the number of participants.

In other embodiments, BEP model 208 can comprise a probability model that predicts the average interval between a chat participant's collaborations defined as messages that provide facts, insights, or opinions or pose relevant questions. Based on collaborative interaction metrics 212, a sample average and variance of intervals for chat participants can be determined and used, for example, to construct a regression model to predict an interval time given the number of chat participants. In still another embodiment, a sample average and variance of the length of chat participants collaborative messages—measured, for example, by a collaboration interaction metric comprising the number of words per message—can be determined and used to construct BEP model 208 as a model to provide an expected extent of collaboration of a chat participant given the number of chat participants engaged in a chat discourse. In yet other embodiments, BEP model 208 can include each of these types of probability models and/or other similar such probability models derived from one or more of various types of collaborative interaction metrics used in various combinations.

In certain embodiments, BEP model 208 is constructed using machine learning. Bystander effect management system 200 thus can include components (e.g., process-executable instructions and/or application-specific processors) that implement machine learning. For example, in accordance with one embodiment, BEP model 208 comprises a deep learning neural network that learns to generate predictions based on collaborative interaction metrics 212 represented vectorially. Once trained, for example, as a linear regression using a set of training data comprising collaborative interaction metrics extracted from prior chat discourses, BEP model 208 can predict one or more collaboration metrics (e.g., number of contributions, intervals between contributions, lengths of contributions) during an on-going chat discourse based on the number of chat participants engaged. BEP model 208, for example, can provide an expected number of contributions, expected time interval between contributions, and/or expected word lengths of contributions. The predicted number of contributions, average word count per contribution, or expected time length between contributions, given a specific number of participants, can be statistically correlated with a probability that one or more chat participants is affected by the bystander effect—that is, that one or more chat participants is relatively less likely to collaborate (engage in the chat discourse) given the number of chat participants. Accordingly, based on such correlation, BEP determiner 202 can determine the likelihood that at least one chat participant is affected by the bystander effect during a chat discourse over an electronic communications network.

BEP determiner 202, in certain embodiments, can determine the likelihood that at least one chat participant is affected by the bystander effect based on a conditional probability, prob (action metric|n), where the probability of an action metric value (e.g., participation through messaging, interval between message and response, length of message) is conditioned on the number, n, of chat participants in a chat discourse. One or more norms (as described below) can be established for actions that represent a chat participants' behavior when affected and when not affected by the bystander effect. If for a specific chat discourse in which n chat participants are engaged, an action metric value that deviates from the statistically established norm (suggesting influence of the bystander effect) is greater than some probability value, $p^*$, such that prob (action metric|n) $> p^*$, then BEP determiner 202 determines that there exists a likelihood of the bystander effect on the chat discourse. In various embodiments, bystander effect management system can use different norms and different probability values, $p^*$, both of which can be specified by a user. In one or more different embodiments, different models based on different distribution functions can be used to determine the probability.

In many instances, the likelihood of the bystander effect affecting one or more chat participants within a specific chat group or a specific chat participant can be influenced by the particular topic of a chat discourse. Accordingly, in certain embodiments, BEP model 208 is generated based on collaboration interaction metrics 212 derived from prior discourses that pertain to a specific topic. Bystander effect management system 200, in accordance with these embodiments, can include machine learning components (e.g., process-executable instructions and/or application-specific processors not explicitly shown) that implement a machine-learned topic model for identifying and classifying chat discourses based on the topic or topics of a chat discourse.

In certain embodiments, bystander effect management system 200 uses probabilistic topic modeling (e.g., latent Dirichlet allocation, probabilistic latent semantic analysis) to identify topics within chat discourses. In other embodiments, bystander effect management system 200 is trained through an automated topic modelling pipeline to identify topics in chat discourses using bi-term topic modelling (BTM). BTM explicitly models word co-occurrence patterns to enhance topic learning. BTM uses aggregated patterns in an entire corpus of chat discourses to solve the problem of sparse word co-occurrence patterns. BTM is adept at identifying topics in short chat discourses (e.g., instant messages). In still other embodiments, bystander effect management system 200 can be trained to identify topics in chat discourses using other topic modeling techniques.

During a real-time chat discourse over an electronic communications network, bystander effect management system 200 can determine the topic of the chat discourse using one or more of the techniques described. BEP determiner 202, accordingly, can determine the likelihood of a bystander effect on at least one chat participant using a topic-specific version of BEP model 208 generated based on collaboration interaction metrics derived from prior discourses that pertain to the same topic. Moreover, if during the chat discourse the topic shifts to a different topic, then bystander effect management system 200 determines the new topic, and BEP determiner 202 can determine the likelihood of a bystander effect using a revised version of BEP model 208 corresponding to the new topic.

Bystander effect management system 200 optionally also can include a tone analyzer that predicts emotions and tones of the chat participant based on text of a collaborative communication. The tone analyzer, using linguistic analysis, initially parses a textual rendering of a communication into sentences and tokens. Nouns, verbs, and other parts of speech are identified by the tone analyzer using parts-of-speech tagging once the textual rendering is parsed into sentences and tokens. The tone analyzer determines the internal structure and meaning of the textual rendering (e.g., entities, purpose, and the like) by breaking the sentences into labeled phrases, including ones identified by the tone analyzer as specific emotions (e.g., joy, fear, sadness, anger, frustration, excitement) and/or tones (e.g., analytical, confident, tentative). A machine learning model can train the tone analyzer to predict tones based on several categories of features including n-gram features, lexical features from different dictionaries, punctuation, and second-person references. The machine learning model, in one embodiment, can comprise a Support Vector Machine (SVM).

The tone analyzer optionally can incorporate capabilities for a chat participant's emotion or tone from voice-based communications. In accordance with the embodiment, the tone analyzer is operatively coupled with a speech-to-text engine to determine the chat participant's emotion based on speech output in real-time during a chat discourse. Accordingly, by coupling bystander effect management system 200 with a voice response system, the tone analyzer can perform tone analysis on voice communications.

In response to BEP determiner 202 determining a likelihood of a bystander effect on one or more chat participants during a chat discourse, BER generator 204 generates a BER. The BER is a response to the potential bystander effect and, based on a BEP model 208 determination is more likely than not to enhance collaboration among at least some of the chat participant engaging in the chat discourse. As expressly defined above, the bystander effect is an effect on one or more chat participants that is likely to affect the chat discourse. The chat discourse is affected by the behavior of each chat participant, and each chat participant's behavior can be affected or influenced by the bystander effect. For example, the effect can be a reduction below an established norm in the likelihood that one or more chat participants will collaborate during the chat discourse. The effect, for example, can be a reduction below an established norm of the average word length of contributions made during the chat discourse. Another effect, for example, can be an increase above an established norm above the expected time interval between collaborations. Each of these norms, as well as various other ones, can be established statistically using data collected from the same prior discourses 214 from which the collaboration interaction metrics 212 are collected for generating BEP model 208.

By virtue of the causal link between occurrence of the bystander effect and the number of chat participants engaging in the chat discourse, a BER generated by BER generator 204 can be a change in how many chat participants are engaging in the chat discourse. Given the stated causality, a reduction in the number of chat participants reduces the likelihood of the bystander effect, which in turn can positively affect behavior of one or more chat participants. As a result, collaboration among chat participants is likely to be enhanced. The enhanced collaboration can be, for example, an increased likelihood of collaboration (e.g., conveying a relevant message), an increased word length of the average message, and/or decreased time interval between messages. Depending on which behavioral measurements are adopted in implementing bystander effect management system 200, reducing the likelihood of bystander effect by reducing the number of participants is expected to enhance collaboration according to any corresponding measurement of chat participant behavior.

In response to BER generator 204 generating the BER, notifier 206 conveys notification 210 to one or more (e.g., selected) or each chat participant over the electronic communications network. In certain embodiments, the notice recommends the BER. In other embodiments, however, chat participants can, by mutual agreement in advance of engaging in chat discourse, consent to an automatic, machine implementation of the BER by bystander management system 200 without human intervention. For example, the chat participants can be members of a chat group that routinely engages in chat discourses using a team collaboration platform, an online discussion forum, a social networking platform, and/or other collaboration platform. The members of the chat group can, for the sake of collaborative efficiency, consent to the automatic, machine implementation of a BER that reduces or changes the composition of chat participants during a chat discourse by disconnecting or blocking electronic communications of some chat participants during the chat discourse. The reduction reduces the likelihood of the bystander effect by reducing the number of chat participants. The number of chat participants can be reduced to a number that, based on BEP model 208, BEP determiner 202 determines is not likely to engender the bystander effect.

Bystander effect management system 200 also can leverage the bystander effect to enhance collaboration during a chat discourse. For example, using established norms such as ones already described, bystander effect management system 200 can determine that too many collaborations are forthcoming that impede progress of the chat discourse. The collaborations, for example, may include too many off-topic or irrelevant messages as determined using NLP, as described above. Accordingly, BEP determiner 202, based on the BEP model 208, can determine a number of chat participants that would likely produce the bystander effect on at least some of the current chat participants, with the expected effect of reducing the collaborations and thus enhancing progress of the chat discourse.

BER generator 204 can generate a BER specifying an addition of chat participants to the chat discourse, the additional number determined to be a number likely to induce the bystander effect. The BER can be noticed to current and potential chat participants by chat group notifier 206. For example, current and potential chat participants may be members of a specific chat group that routinely engages in chat discourses using a team collaboration platform, an online discussion forum, a social networking platform, and/or other collaboration platform. Potential chat participants can be identified by bystander effect management system 200 as chat group members not engaging in the current, on-going chat discourse or otherwise having a presence (e.g., indicated to the system as "unavailable"). Bystander effect management system 200 can identify one or more members of the chat group to include in the chat discourse, and chat group notifier 206 can convey an invitation via an electronic communications network inviting the one or more chat group members to join the chat discourse. In response to determining that at least one of the chat group members is presently unable to join the chat discourse, bystander effect management system 200 can reschedule the chat discourse. Bystander effect management system 200 can schedule the chat discourse to resume at time when each of the chat group members identified for joining in the chat discourse are available.

By advance agreement among members of separate chat group groups, bystander effect management system 200 can use chat histories of the chat groups' members to identify one or more members of the chat group to include in a chat discourse regarding a specific topic. Bystander effect management system 200, based on chat histories can identify the number of on-topic chat utterances (messages) a user expresses in other group chats, and based on the number, determine that the member should be added to similar group chats given the history of on-topic messaging. Conversely, a chat participant that posts general chat utterances that are not germane to a discussion can be excluded. The chat histories can function similar to a league ranking in that more general, non-germane posts, will "relegate" a chat participant, whereas on-topic posts will "promote" the chat participant.

Optionally, bystander effect management system 200 is capable of setting a time for other members of the chat group to join as chat participants in the current, on-going chat discourse. If an insufficient number join, BER generator 204 can generate a new BER that is notified to the members of the chat group. The new BER can recommend discontinuing the chat discourse and resuming when the number of chat participants needed—as determined by BEP determiner 202 based on BEP model 208—are available to continue the chat discourse.

Thus, with respect to both mitigating and leveraging the bystander effect, the BER generated by BER generator 204 can be a change in the number of chat participants engaging in a chat discourse. As described, a reduction in the number of chat participants reduces the likelihood of the bystander effect and is correspondingly likely to enhance collaboration among the remaining chat participants. Conversely, as also described, collaboration can be enhanced in some instance by increasing the number of chat participants. Increasing the number of chat participants can, owing to the bystander effect, reduce the likelihood of chat participants engaging in an on-going chat discourse. Correspondingly, the likelihood of users injecting off-topic or irrelevant messages into the chat discourse is reduced by increasing the number of chat participants.

Bystander effect management system 200 in certain embodiments can change not only how may chat participants are engaging in the chat discourse, but also the composition of the chat participants as well. For example, by identifying the topic of the chat discourse, BER generator 204 can generate a BER that comprises eliminating chat participants from or injecting chat participants into a chat discourse based on an association between the topic identified and individual chat participants. If, for example, chat participants are members of a chat group that routinely engages in chat discourses using one or more collaboration platforms, the association can be each chat participant's expertise in or experience with the topic. Thus, in response to BEP determiner 202 determining that the likelihood of a bystander effect exceeds a predetermined threshold, BER generator 204 can generate a BER that selects chat participants for inclusion or exclusion based on each chat participant's expertise and/or experience with respect to the topic.

In other embodiments, bystander effect management system 200 can use geographic location as qualifying factor for including or excluding chat participants in a chat discourse. Thus, if topic (identified as described above) of the chat discourse is related to a certain location, BER generator 204 can generate a BER for selecting chat participants to include or exclude in the chat discourse based on the location associated with each of the chat participants. For example, the chat discourse may relate to a state-wide legislative proposal that would affect only residents of the state to which the proposed legislation pertains. Accordingly, the BER can exclude from the chat discourse any chat participant that is not a resident of the state. Conversely, if bystander effect management system 200 determines that the chat discourse can be enhanced by leveraging the bystander effect, as described above, BER generator 204 can generate a BER that requests or encourages members of the chat group who are residents to join the chat discourse as chat participants.

In still other embodiments, bystander effect management system 200 optionally constructs a social graph for members of a chat group that routinely engages in chat discourses using one or more collaboration platforms. As defined herein, "social graph" is a data structure that identifies which members of the chat group discuss which topics with one another and with what frequency. In one embodiment, the social graph can comprise a vector space in which positions within the graph are represented as vectors whose elements correspond to chat group member identifiers, each identified member's interactions with other members, and specific topics. Chat group members can be clustered into subgroups based on closeness measured by a cosine difference. Thus, bystander effect management system 200 can identify, for example, a subset of the chat groups members who frequently (e.g., according to a predefined minimum threshold distance) discuss a specific set of one or more topics, whereas other members of the chat group never or less frequently do so.

Accordingly, BER generator 204 can generate a BER for selecting members of the chat group to include or exclude in a chat discourse by measuring for each member of the chat group a relative position on the social graph to determine a distance (e.g., cosine distance) between each pair of members of the chat group, and selecting members of the chat group to include or exclude in the chat discourse based on the distance between each pair of members. For example, in the event that the BER generated by BER generator 204 is to reduce the number of chat participants by n so that the remaining number of chat participants corresponds to a number that renders the possibility of the bystander effect unlikely, bystander effect management system 200 can select for excluding from the chat discourse the n chat participants whose relative positions on the social graph (e.g., measured by a cosine distance) indicate infrequent collaborations with other members of the chat group. In embodiments in which a greater distances (e.g., cosine distance) on the social graph indicates a lesser frequency of interaction, bystander effect management system 200 can begin by excluding the chat participant whose relative position is the greatest distance from each other chat participant's position and then continue by excluding the chat participant whose relative position corresponds to the next-greatest distance, continuing seriatim until n chat participants are excluded from the chat discourse. Conversely, if instead the BER calls for adding chat participants to a chat discourse, bystander effect management system 200 can sequentially add chat participants beginning with the chat participant whose relative position on the social graph is closest the relative positions of each other chat participant and continue until the desired number of chat participants is reached.

In yet other embodiments, in which bystander effect management system 200 incorporates the above-described tone analyzer, BER generator 204 can generate a BER for selecting members of the chat group to include or exclude in a chat discourse. For example, if BEP determiner 202 determines a likelihood of the bystander effect, BER generator 204 can generate a BER that reduces the number of chat participants by excluding ones whose collaborative messaging is identified as expressing anger or frustration, and including ones whose collaborative messaging is classified as analytical or confident in tone.

FIG. 3 is a flowchart of method 300 for bystander effect management according to an embodiment. Method 300 can be performed by a system the same as or similar to the systems described with reference to FIGS. 1-3. The system at block 302 can determine the likelihood of a bystander effect on one or more chat participants engaging in a chat discourse over an electronic communications network. The system can determine the likelihood using a BEP model generated based on collaboration interaction metrics that are derived from prior discourses conducted over one or more electronic communications networks by one or more chat groups.

The system at block 304 can generate a BER in response to a determination at block 302 that the likelihood of the bystander effect exceeds a predetermined threshold. The BER can be determined based on the BEP model to be more likely than not to enhance collaboration among at least some chat participants engaging in the chat discourse. At block 306, the system can convey a notification based on the BER to at least some chat participants engaging in the chat discourse over the electronic communications network. In certain embodiments, the BEP model is generated through machine learning.

The collaboration interaction metrics, in some embodiments, are derived by the system from prior discourses that each pertain to a topic that the system identifies with a topic model generated through machine learning. The topic model can comprise a latent Dirichlet allocation, in some embodiments. In other embodiments, the topic model can comprise probabilistic latent semantic analysis. In still other embodiments, the topic model can comprise a bi-term topic modeling.

The system can generate a BER that changes how many chat participants are engaging in the chat discourse based on one or more topics. The system can associate an expertise with respect to the topic and/or an experience with respect to the topic for each chat participant. The system can select chat participants to include or exclude in the chat discourse based on the expertise and/or experience associated with each of the chat participants.

The system can generate a BER that changes how many chat participants are engaging in the chat discourse based on locations related to one or more topics. The system can associate a location with each of the chat participants in response to determining that the location relates to a topic of the chat discourse. The system can select chat participants to include or exclude in the chat discourse based on the location associated with each of the chat participants.

In other embodiments, the system can measure the relative position of each member of a chat group based on a social graph. The system can select members of the chat group to include or exclude in the chat discourse based on the distance between each pair of members in the social graph.

In still other embodiments, the system can leverage the bystander effect by increasing the number of chat participants engaging in the chat discourse. Accordingly, the system can identify one or more members of a chat group to add to the chat discourse. The system can convey an invitation via the electronic communications network inviting the one or more chat group members to join the chat discourse. If the system determines that at least one member of the chat group invited to join is presently unable to join the chat discourse, then the system can reschedule the chat discourse to resume when each of the invited chat group members is able to join the chat discourse.

It is understood that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
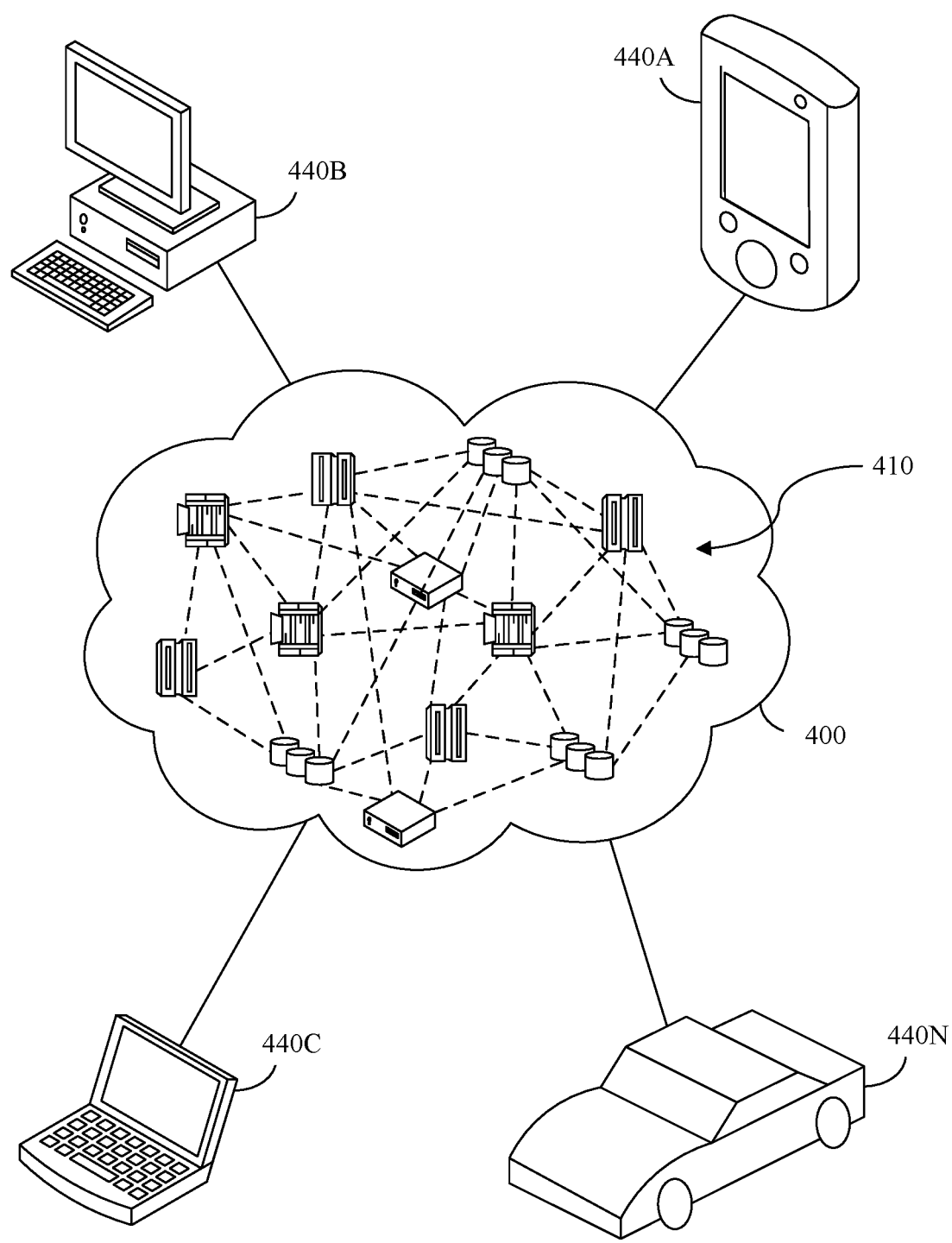
FIG. 4 depicts a cloud computing environment according to an embodiment.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440a, desktop computer 440b, laptop computer 440c, and/or automobile computer system 440n may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440a-n shown in FIG. 4 are intended to be illustrative only and that computing nodes 410 and cloud computing environment 400 can communicate with any type of computerized device over any type of network and/or network addressable connection (e.g., using a web browser).

Figure 5:
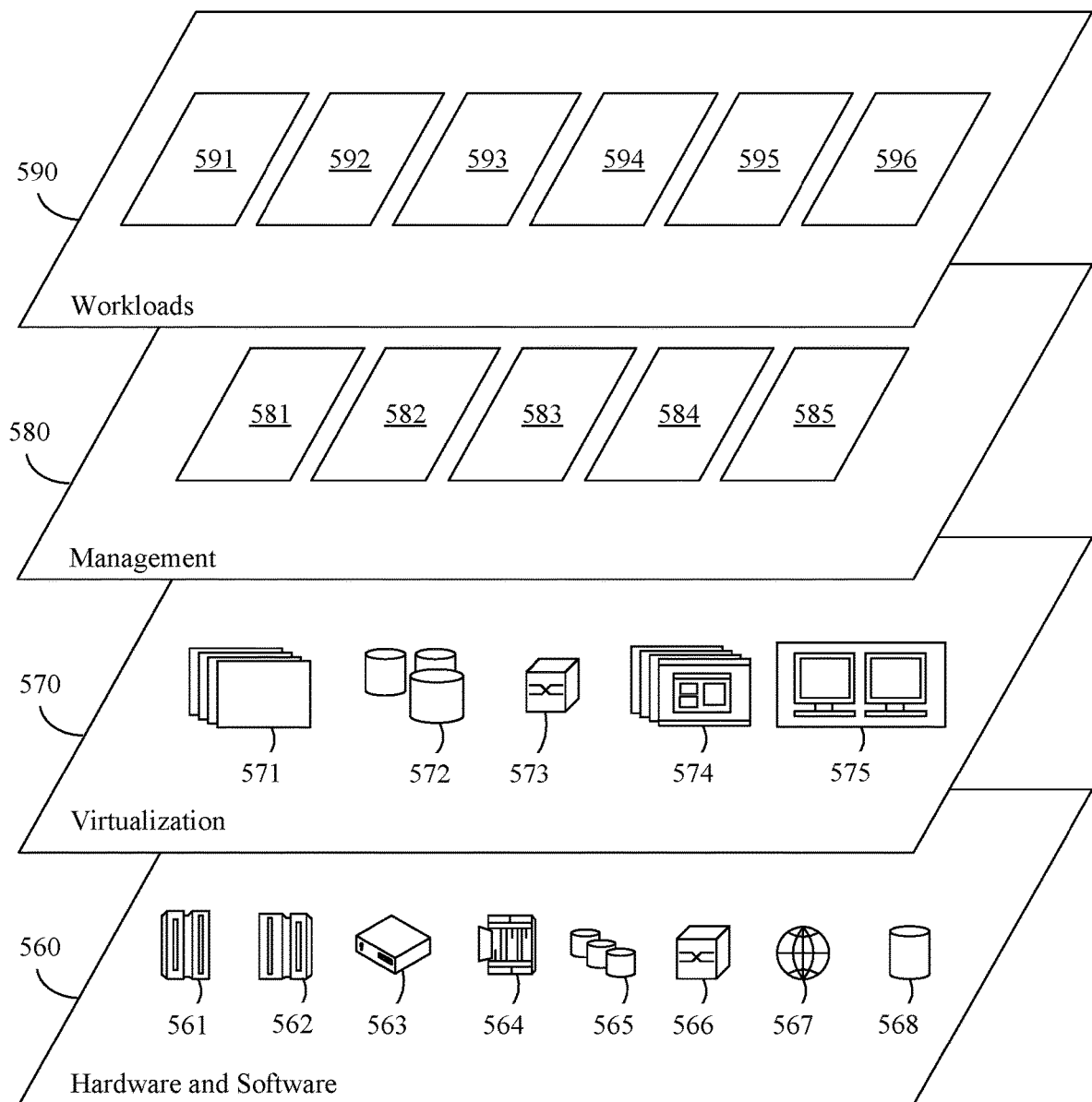
FIG. 5 depicts abstraction model layers according to an embodiment.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA. Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and bystander effect management system 596.

Figure 6:
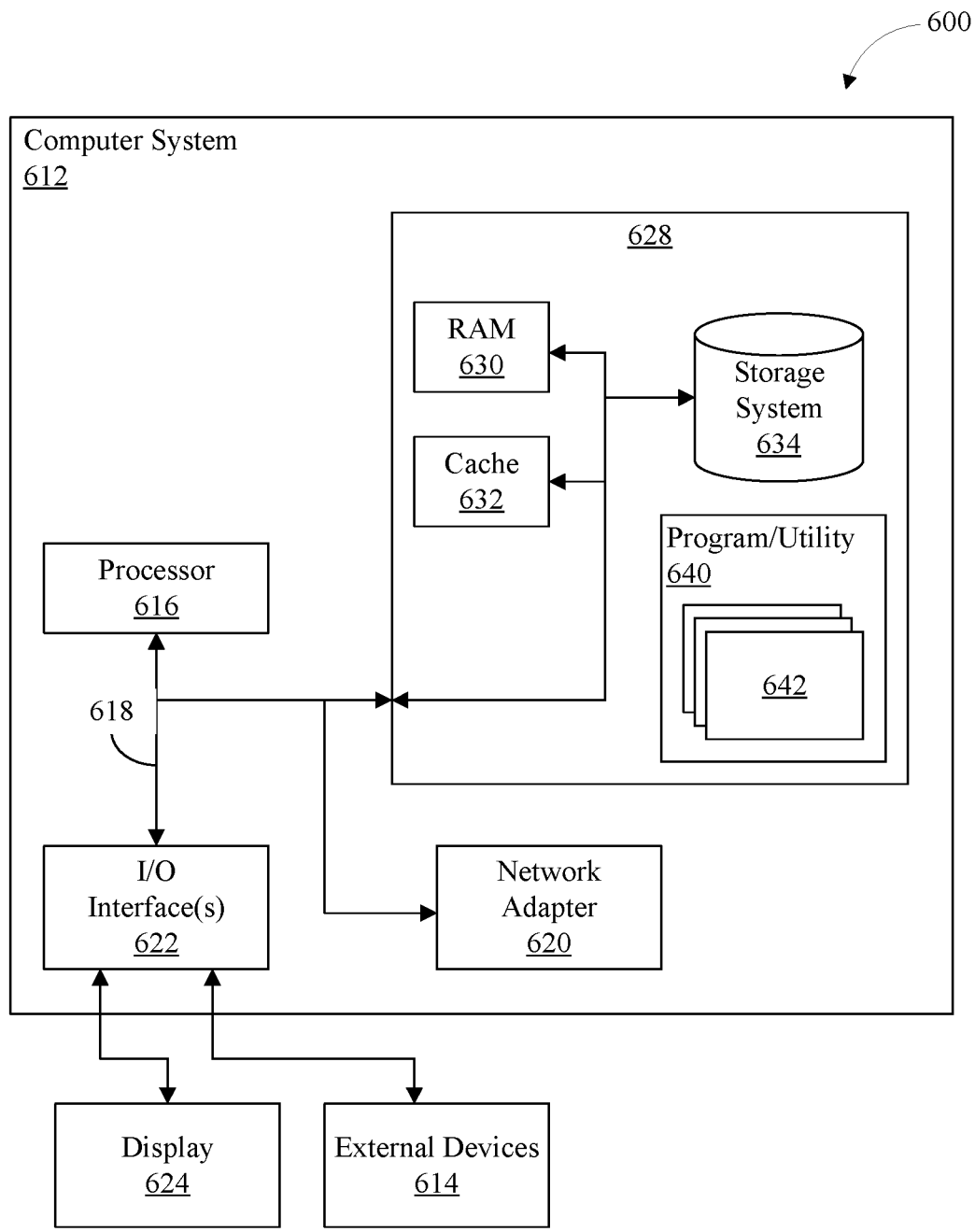
FIG. 6 depicts a cloud computing node according to an embodiment.

FIG. 6 illustrates a schematic of an example of a computing node 600. In one or more embodiments, computing node 600 is an example of a suitable cloud computing node. Computing node 600 is not intended to suggest any limitation as to the scope of use or functionality of embodiments of the invention described herein. Computing node 600 is capable of performing any of the functionality described within this disclosure.

Computing node 600 includes a computer system 612, which is operational with numerous other general-purpose or special-purpose computing system environments or configurations. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system-executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors 616, a memory 628, and a bus 618 that couples various system components including memory 628 to processor 616. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 618 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA)

bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 612 typically includes a variety of computer system-readable media. Such media may be any available media that is accessible by computer system 612, and may include both volatile and non-volatile media, removable and non-removable media.

Memory 628 may include computer system readable media in the form of volatile memory, such as random-access memory (RAM) 630 and/or cache memory 632. Computer system 612 may further include other removable/non-removable, volatile/non-volatile computer system storage media. By way of example, storage system 634 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. For example, one or more of the program modules may include bystander effect management system 696 or portions thereof.

Program/utility 640 is executable by processor 616. Program/utility 640 and any data items used, generated, and/or operated upon by computer system 612 are functional data structures that impart functionality when employed by computer system 612. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via input/output (I/O) interfaces 622. Still, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

While computing node 600 is used to illustrate an example of a cloud computing node, it should be appreciated that a computer system using an architecture the same as or similar to that described in connection with FIG. 6 may be used in a non-cloud computing implementation to perform the various operations described herein. In this regard, the example embodiments described herein are not intended to be limited to a cloud computing environment. Computing node 600 is an example of a data processing system. As defined herein, "data processing system" means one or more hardware systems configured to process data, each hardware system including at least one processor programmed to initiate operations and memory.

Computing node 600 is an example of computer hardware. Computing node 600 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 600 is also an example of a server. As defined herein, "server" means a data processing system configured to share services with one or more other data processing systems. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, the phrases "in response to" and "responsive to" means responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user," "individual," and "chat participant" refer to a human being. Likewise, as defined herein "users," "individuals," and "chat participants" refer to human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed within a bystander effect management system coupled to a messaging platform and executing on a server, comprising:
    extracting, by an interaction metrics extractor of the bystander effect management system and from prior chat discourses conducted over an electronic communication network by a chat group using the messaging platform, collaboration interaction metrics;
    generating, using machine learning components including artificial intelligence, a computer-implemented bystander effect perception (BEP) model based on the collaboration interaction metrics;
    determining, with the bystander effect management system and using the BEP model, a likelihood of a bystander effect on at least one chat participant engaging in a chat discourse over the electronic communications network;
    generating, in response to determining that the likelihood exceeds a predetermined threshold, a bystander effect reaction (BER) that enhances collaboration among at least some chat participants engaging in the chat discourse,
    automatically modifying, based upon the BER, a number of chat participants engaging in the chat discourse; and
    electronically sending a notification based on the BER to at least one chat participant engaging in the chat discourse over the electronic communications network, wherein
    the BEP model includes a deep learning neural network, and
    the BER is a computer-implemented action,
    the collaboration interaction metrics are derived from prior discourses that each pertain to a topic that is identified using bi-term topic modeling (BTM) generated through machine learning, and
    the BTM employs aggregated word co-occurrence patterns from the prior discourses to identify the topic.

2. The method of claim 1, wherein
the BER changes how many chat participants are engaging in the chat discourse, and further comprising:
associating with each of the chat participants at least one of an expertise with respect to the topic or an experience with respect to the topic; and
selecting chat participants to include or exclude in the chat discourse based on at least one of an expertise or experience associated with each of the chat participants.

3. The method of claim 1, wherein
the BER changes how many chat participants are engaging in the chat discourse, and further comprising:
associating a location with each of the chat participants in response to determining that the location relates to a topic of the chat discourse; and
selecting chat participants to include or exclude in the chat discourse based on the location associated with each of the chat participants.

4. The method of claim 1, wherein
the BER changes how many chat participants are engaging in the chat discourse, and further comprising:
measuring for each member of the chat group a relative position on a social graph and determining a distance between each pair of members of the chat group; and
selecting members of the chat group to include or exclude in the chat discourse based on the distance between each pair of members.

5. The method of claim 1, wherein
the BER increases a number of chat participants engaging in the chat discourse, and further comprising:
identifying at least one member of a chat group to add to the chat discourse and conveying an invitation via the electronic communications network inviting the at least one member of the chat group to join the chat discourse; and rescheduling the chat discourse in response to determining that the at least one member of the chat group is presently unable to join the chat discourse.

6. A bystander effect management system coupled to a messaging platform and executing on a server, comprising:
a processor configured to initiate operations including:
extracting, by an interaction metrics extractor of the bystander effect management system and from prior chat discourses conducted over an electronic communication network by a chat group using the messaging platform, collaboration interaction metrics;
generating, using machine learning components including artificial intelligence, a computer-implemented bystander effect perception (BEP) model based on the collaboration interaction metrics;
determining, with the bystander effect management system and using the BEP model, a likelihood of a bystander effect on at least one chat participant engaging in a chat discourse over the electronic communications network;
generating, in response to determining that the likelihood exceeds a predetermined threshold, a bystander effect reaction (BER) that enhances collaboration among at least some chat participants engaging in the chat discourse,
automatically modifying, based upon the BER, a number of chat participants engaging in the chat discourse; and
electronically sending a notification based on the BER to at least one chat participant engaging in the chat discourse over the electronic communications network, wherein
the BEP model includes a deep learning neural network, and
the BER is a computer-implemented action
the collaboration interaction metrics are derived from prior discourses that each pertain to a topic that is identified using bi-term topic modeling (BTM) generated through machine learning, and
the BTM employs aggregated word co-occurrence patterns from the prior discourses to identify the topic.

7. The system of claim 6, wherein
the BER changes how many chat participants are engaging in the chat discourse, and wherein the processor is configured to initiate operations further comprising:
associating with each of the chat participants at least one of an expertise with respect to the topic or an experience with respect to the topic; and
selecting chat participants to include or exclude in the chat discourse based on at least one of an expertise or experience associated with each of the chat participants.

8. The system of claim 6, wherein
the BER changes how many chat participants are engaging in the chat discourse, and wherein the processor is configured to initiate operations further comprising:
associating a location with each of the chat participants in response to determining that the location relates to a topic of the chat discourse; and
selecting chat participants to include or exclude in the chat discourse based on the location associated with each of the chat participants.

9. The system of claim 6, wherein
the BER changes how many chat participants are engaging in the chat discourse, and wherein the processor is configured to initiate operations further comprising:
measuring for each member of the chat group a relative position on a social graph and determining a distance between each pair of members of the chat group; and
selecting members of the chat group to include or exclude in the chat discourse based on the distance between each pair of members.

10. A computer program product, the computer program product comprising:
one or more non-transitory computer-readable storage media and program instructions collectively stored on the one or more non-transitory computer-readable storage media,
the program instructions executable by a bystander effect management system coupled to a messaging platform and executing on a server to cause the bystander effect management system to perform:
generating, using machine learning components including artificial intelligence, a computer-implemented bystander effect perception (BEP) model based on the collaboration interaction metrics;
determining, with the bystander effect management system and using the BEP model, a likelihood of a bystander effect on at least one chat participant engaging in a chat discourse over the electronic communications network;
generating, in response to determining that the likelihood exceeds a predetermined threshold, a bystander effect reaction (BER) that enhances collaboration among at least some chat participants engaging in the chat discourse,
automatically modifying, based upon the BER, a number of chat participants engaging in the chat discourse; and
electronically sending a notification based on the BER to at least one chat participant engaging in the chat discourse over the electronic communications network, wherein
the BEP model includes a deep learning neural network, and
the BER is a computer-implemented action
the collaboration interaction metrics are derived from prior discourses that each pertain to a topic that is identified using bi-term topic modeling (BTM) generated through machine learning, and
the BTM employs aggregated word co-occurrence patterns from the prior discourses to identify the topic.

11. The computer program product of claim 10, wherein the BER changes how many chat participants are engaging in the chat discourse, and wherein the program instructions are executable by the processor to cause the processor to initiate operations further comprising:
associating with each of the chat participants at least one of an expertise with respect to the topic or an experience with respect to the topic; and
selecting chat participants to include or exclude in the chat discourse based on at least one of an expertise or experience associated with each of the chat participants.

12. The computer program product of claim 10, wherein the BER changes how many chat participants are engaging in the chat discourse, and wherein the program instructions are executable by the processor to cause the processor to initiate operations further comprising:
associating a location with each of the chat participants in response to determining that the location relates to a topic of the chat discourse; and selecting chat participants to include or exclude in the chat discourse based on the location associated with each of the chat participants.

13. The computer program product of claim 10, wherein the BER changes how many chat participants are engaging in the chat discourse, and wherein the program instructions are executable by the processor to cause the processor to initiate operations further comprising:

measuring for each member of the chat group a relative position on a social graph and determining a distance between each pair of members of the chat group; and selecting members of the chat group to include or exclude in the chat discourse based on the distance between each pair of members.

14. The computer program product of claim 10, wherein the BER increases a number of chat participants engaging in the chat discourse, and wherein the program instructions are executable by the processor to cause the processor to initiate operations further comprising:

identifying at least one member of a chat group to add to the chat discourse and conveying an invitation via the electronic communications network inviting the at least one member of the chat group to join the chat discourse; and rescheduling the chat discourse in response to determining that the at least one member of the chat group is presently unable to join the chat discourse.

* * * * *